J. M. MAYHEW.
WINDLASS, &c.
No. 174,270.  Patented Feb. 29, 1876.
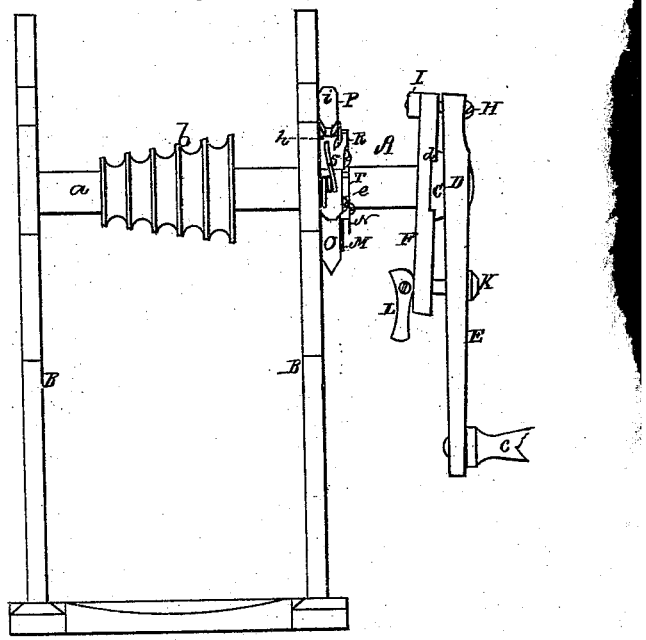
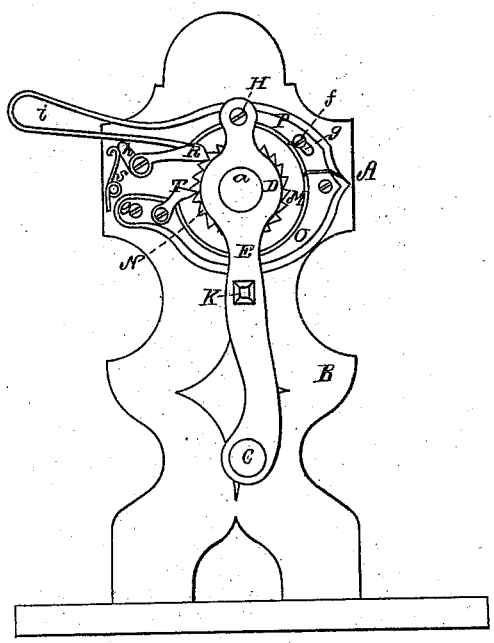
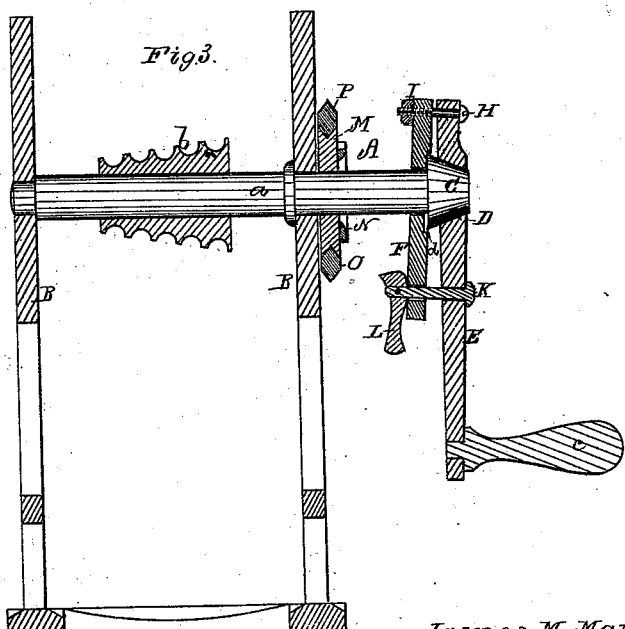
Witnesses
S. N. Piper
L. N. Miller
James M. Mayhew
by his attorney
R. H. Eddy

UNITED STATES PATENT OFFICE.

JAMES M. MAYHEW, OF MANSFIELD, MASSACHUSETTS.

IMPROVEMENT IN WINDLASSES, &c.

Specification forming part of Letters Patent No. 174,270, dated February 29, 1876; application filed January 21, 1876.

*To all whom it may concern:*

Be it known that I, JAMES M. MAYHEW, of Mansfield, of the county of Bristol and State of Massachusetts, have made a new and useful invention having reference to Windlasses, &c.; and do hereby declare the same to be fully described in the following specification, and represented in the accompanying drawings, of which—

Figure 1 is a front elevation; Fig. 2, an end view, and Fig. 3 a longitudinal and vertical section of a conic and grooved windlass provided with my invention or improvement for revolving it and for checking it in its motion.

In these drawings, A denotes the windlass, composed of a shaft, $a$, and a grooved conical body, $b$, the latter being arranged on the shaft as shown. The windlass-bits are represented at B B, the shaft having bearings in them. At one end the shaft has fixed on it a conic frustum, C, which is encompassed by a conical collar, D, making part of a lever, E, provided with a crank or handle, $c$, all being as shown. A shorter lever, F, turns freely on the shaft, and is arranged as represented, with respect to the shoulder or larger base $d$, of the frustum C. A screw, H, goes through the shorter arms of both levers and receives upon its thread a nut, I. Furthermore, a bolt, K, introduced through the longer arms of both levers, has pivoted upon its inner end a cammed lever, L. By turning the latter into a right angle with the shorter lever, the conical collar D of the longer lever will be borne so strongly against the conic frustum C as to engage the shaft to the levers, with a friction sufficient to cause it to be revolved by power applied to the handle $c$ to turn such. By means of the screw H and nut I the cammed lever may be made to act with greater or less force, as occasion may require. The shaft and its crank thus have appliances by which the crank may be so disengaged relatively to the shaft as to allow the latter to revolve independently of such shaft, or the two may be so coupled as to cause the shaft to be revolved by the crank, when the latter may be turned around by power applied to its handle. Instead of the bolt and nut connecting the shorter arms of the levers, they may be hinged or pivoted together, but the bolt and nut are preferable, especially with reference to the cammed lever and its bolt applied to the longer arms of said levers. There is fixed on the shaft $a$ a brake-wheel, M, which I prefer to have grooved, as shown, on and around its periphery. On the side of the said wheel M is a ratchet-wheel N. Furthermore, there is pivoted to the next adjacent bit a curved brake, O, to extend underneath and partially encompass the wheel M, the pivot of the said brake being shown at $e$, it being near the lower end of the brake. At or near its upper end the said brake is pivoted to another or lever brake, P, that turns on a pivot, $f$, extended through a slot, $g$, made in the said brake P. The slot enables the upper brake to move backward as well as downward, in order that the entire rubbing-surfaces of both brakes may be brought in close contact with the periphery of the brake-wheel, which could not well be effected without the slot or by a simple cylindrical hole to receive and fit to the pivot of the upper brake. There is to the ratchet-wheel N a stop-pawl, R, it being pivoted to the bit. From this stop-pawl there projects upward and directly underneath the lever-brake P a short inclined arm, $h$. On pressing down the handle $i$ of the lever-brake P, it will be forced against the said short arm in a manner to cause the pawl R to be thrown out of engagement with the ratchet-wheel before the brakes are brought into action upon the brake-wheel. A spring, S, applied to the bit and bearing against the arm $h$, insures the fall of the pall into engagement with the ratchet when the upper brake-lever is raised out of bearing upon the brake-wheel. T is an auxiliary pawl, which is pivoted to the lower brake, and is for use with the ratchet-wheel, such pawl being thrown back out of engagement therewith after the brake may have been thrown into action with such wheel. The auxiliary pawl is to prevent any sudden back revolution of the brake-wheel while the main pawl is in the act of being raised and the upper of the brakes is being brought into engagement with such brake-wheel. When the windlass is to be allowed to revolve so as to unwind the rope of its barrel, the cammed lever L should first be turned back so as to cause the levers E F to be unclamped from the shaft, in order that the latter may freely revolve without revolving the levers with it. Next, the auxiliary pawl should be thrown out of engagement with the ratchet-wheel, after which the upper brake should be forced down so as to release the main pawl from the ratchet and bring the brakes into action upon the wheel, the pressure of them against the wheel being regulated to cause the windlass to revolve with the requisite degree of speed.

I claim as my invention as follows, that is to say—

The combination of the conic frustum C, crank-lever E, collar D, auxiliary lever F, the bolt K, and cammed lever L, all being arranged and applied together and to the shaft, substantially in manner and to operate as specified.

JAMES M. MAYHEW.

Witnesses:
R. H. EDDY,
J. R. SNOW.